US006269660B1

(12) United States Patent
Kondo et al.

(10) Patent No.: US 6,269,660 B1
(45) Date of Patent: Aug. 7, 2001

(54) LAMP FOR A VEHICLE AND METHOD OF MAKING THE SAME

(75) Inventors: Toshiyuki Kondo; Toshio Miyokawa, both of Tokyo (JP)

(73) Assignee: Stanley Electric Co., Ltd. (JP)

( * ) Notice: Subject to any disclaimer, the term of this patent is extended or adjusted under 35 U.S.C. 154(b) by 0 days.

(21) Appl. No.: 09/293,720

(22) Filed: Apr. 16, 1999

(30) Foreign Application Priority Data

Apr. 17, 1998 (JP) ........................................ 10-107890

(51) Int. Cl.$^7$ ........................................ B60Q 1/00

(52) U.S. Cl. ........................ 65/29.11; 65/61; 65/DIG. 13; 362/332; 362/336; 362/521; 362/522; 362/487

(58) Field of Search .................... 65/29.11, 61, DIG. 13; 362/451, 487, 509, 520, 522, 332, 336

(56) References Cited

U.S. PATENT DOCUMENTS 4,927,248 5/1990 Sakakibara et al. ................ 350/452
5,548,498 8/1996 Murakami ........................... 362/336

FOREIGN PATENT DOCUMENTS 0721083 7/1996 (EP) .
8-148006 * 6/1996 (JP) .

OTHER PUBLICATIONS

Patent Abstracts of Japan, vol. 1996, No. 10, Oct. 31, 1996 & JP 08 148006 A (Stanley Electric Co Ltd), Jun. 7, 1996, abstract.

* cited by examiner

*Primary Examiner*—Sean Vincent
(74) *Attorney, Agent, or Firm*—Ostrolenk, Faber, Gerb & Soffen, LLP

(57) ABSTRACT

A lamp for vehicle that includes a light source, a housing, a reflector and a lens is disclosed. The lens is made by the process that includes the steps of (a) assuming an imaginary plane with a cross hatching pattern made of crossing groups of plural lines disposed in parallel at a constant pitch, (b) deforming the imaginary plane by a desired shape consisting of a convex surface, a concave surface or a combination of both surfaces, so that the cross hatching pattern is deformed into a process surface, and (c) processing a lens cut in accordance with the cross hatching pattern when the process surface is orthographically projected onto the lens surface. The deformation given to the imaginary plane is performed so that the maximum pitch of the cross hatching pattern orthographically projected onto the lens surface is 1.5 times or more and 20 times or less the minimum pitch. The lens cut may have curvatures of the same diffusion coefficient regardless of the pitch of the cross hatching pattern. Alternatively, the lens cut may have a curvature whose diffusion coefficient becomes greater when the pitch of the cross hatching pattern becomes greater. A convex or concave rib can be formed as a discontinuous portion in at least a part of the substantial boundary between the process surface in which the cross hatching pattern of the lens surface is deformed and the process surface in which the cross hatching pattern is not is deformed.

8 Claims, 4 Drawing Sheets

LAMP FOR A VEHICLE AND METHOD OF MAKING THE SAME

BACKGROUND OF THE INVENTION

1. Field of the Invention

The present invention relates to a lamp for a vehicle. More specifically, the present invention relates to a lamp for vehicle such as a headlamp or a tail lamp with an improved design that can give a three-dimensional appearance to the light emission surface.

2. Background Art

A conventional lamp for vehicle having such a configuration is disclosed in Japanese Unexamined Patent Publication No. Hei 8-148006, for example, which was applied by the same applicant and was invented by the same inventors as the present invention. This lamp for a vehicle uses imaginary plane 10 shown in FIG. 1, to which a cross hatching pattern 11 is applied. The cross hatching pattern 11 consists of two crossing groups of plural lines that are disposed in parallel at a constant pitch. This imaginary plane 10 is deformed into a desired shape. Thus, a process surface 12 is formed, in which the pitch of the cross hatching pattern is changed in accordance with the deformed shape. A planar deformed cross hatching pattern 14 is obtained by orthographically projecting the pattern of the process surface 12 onto a lens surface 13. The lens surface is processed in accordance with the projected pattern. The processed lens surface 13 formed by the above-mentioned process gives an observer an optical illusion that it is deformed into the shape given to the process surface 12, so that a three-dimensional appearance is given to the lens surface 13.

However, in the above-mentioned lamp for vehicle discloses only the meaning for changing the pitch of the lens cut processed to the lens surface. Therefore, depending on the shape of the deformation, an excessive rate of difference can be generated among the pitch, so that the production of the lamp is difficult. In addition, it is possible that an expected effect of the three-dimension appearance cannot be obtained. Furthermore, the production of the mold may require much effort, so a partial modification is difficult. It is desired to solve these problems.

SUMMARY OF THE INVENTION

An object of the present invention is to provide a lamp for vehicle, which can improve a variation of design for realizing a desired three-dimensional appearance by lens cut processed to the lens surface.

Another object of the present invention is to provide a lamp for a vehicle, which can give a desired three-dimensional appearance by lens cut processed to the lens surface, and can realize quick and inexpensive modification of the model.

A first aspect of the present invention is a lamp for a vehicle that includes a light source, a housing, a reflector and a lens, in which the lens is made by the process that includes the steps of (a) assuming an imaginary plane with a cross hatching pattern made of crossing groups of plural lines disposed in parallel at a constant pitch, (b) deforming the imaginary plane by a desired shape consisting of a convex surface, a concave surface or a combination of both surfaces, so that the cross hatching pattern is deformed into a process surface, and (c) processing a lens cut in accordance with the cross hatching pattern when the process surface is orthographically projected onto the lens surface, and the deformation given to the imaginary plane is performed so that the maximum pitch of the cross hatching pattern orthographically projected onto the lens surface is 1.5 times or more and 20 times or less the minimum pitch.

According to the above-mentioned configuration, the state where the three-dimensional appearance is insufficient or the lens cut is impossible can be avoided. Thus, an excellent effect of improving the efficiency in designing and producing the lamp for vehicle can be obtained.

A second aspect of the present invention is a lamp for a vehicle that includes a light source, a housing, a reflector and a lens, in which the lens is made by the process that includes the steps of (a) assuming an imaginary plane with a cross hatching pattern made of crossing groups of plural lines disposed in parallel at a constant pitch, (b) deforming the imaginary plane by a desired shape consisting of a convex surface, a concave surface or a combination of both surfaces, so that the cross hatching pattern is deformed into a process surface, and (c) processing a lens cut in accordance with the cross hatching pattern when the process surface is orthographically projected onto the lens surface, and the lens cut has curvatures of the same diffusion coefficient regardless of the pitch of the cross hatching pattern.

A third aspect of the present invention is a lamp for vehicle that includes a light source, a housing, a reflector and a lens, in which the lens is made by the process that includes the steps of (a) assuming an imaginary plane with a cross hatching pattern made of crossing groups of plural lines disposed in parallel at a constant pitch, (b) deforming the imaginary plane by a desired shape consisting of a convex surface, a concave surface or a combination of both surfaces, so that the cross hatching pattern is deformed into a process surface, and (c) processing a lens cut in accordance with the cross hatching pattern when the process surface is orthographically projected onto the lens surface, and the lens cut has a curvature whose diffusion coefficient becomes greater when the pitch of the cross hatching pattern becomes greater.

According to the above-mentioned configuration, the lens surface can emit in the uniform brightness, and the portion with the greater pitch can be brighter so as to generate more optical illusions for providing more three-dimensional appearance. Such a lamp for vehicle can give excellent effect of improving designs as much variation.

A fourth aspect of the present invention is a lamp for vehicle that includes a light source, a housing, a reflector and a lens, in which the lens is made by the process that includes the steps of (a) assuming an imaginary plane with a cross hatching pattern made of crossing groups of plural lines disposed in parallel at a constant pitch, (b) deforming the imaginary plane by a desired shape consisting of a convex surface, a concave surface or a combination of both surfaces, so that the cross hatching pattern is deformed into a process surface, and (c) processing a lens cut in accordance with the cross hatching pattern when the process surface is orthographically projected onto the lens surface, and a convex or concave rib is formed as a discontinuous portion in at least a part of the substantial boundary between the process surface in which the cross hatching pattern of the lens surface is deformed and the process surface in which the cross hatching pattern is not is deformed.

According to the above-mentioned configuration, only the deforming portion should be remade when the design is modified. Therefore, this lamp for vehicle can respond a minor modification of the car quickly and economically so as to answer a request of market. Thus, the responsiveness can be improved.

DETAILED DESCRIPTION OF THE PREFERRED EMBODIMENTS

The present invention will be described in detail hereinafter in accordance with embodiments shown in the accompanying drawings. The method for setting lens cut of the present invention is similar to the conventional method described in the Japanese Unexamined Patent Publication No. Hei 8-148006. For example, an imaginary plane 10 is assumed, in which there is a cross hatching pattern consisting of crossing groups of plural lines disposed in parallel at a constant pitch. The imaginary plane is deformed to a desired shape including a convex surface, a concave surface or a combination of both surfaces. The obtained process surface of the deformed cross hatching pattern is orthographically projected onto the lens surface so as to form a planar process cross hatching pattern on the lens surface. Lens cut is processed to the lens surface in accordance with the pattern that is formed by the above-mentioned process.

Figure 1:
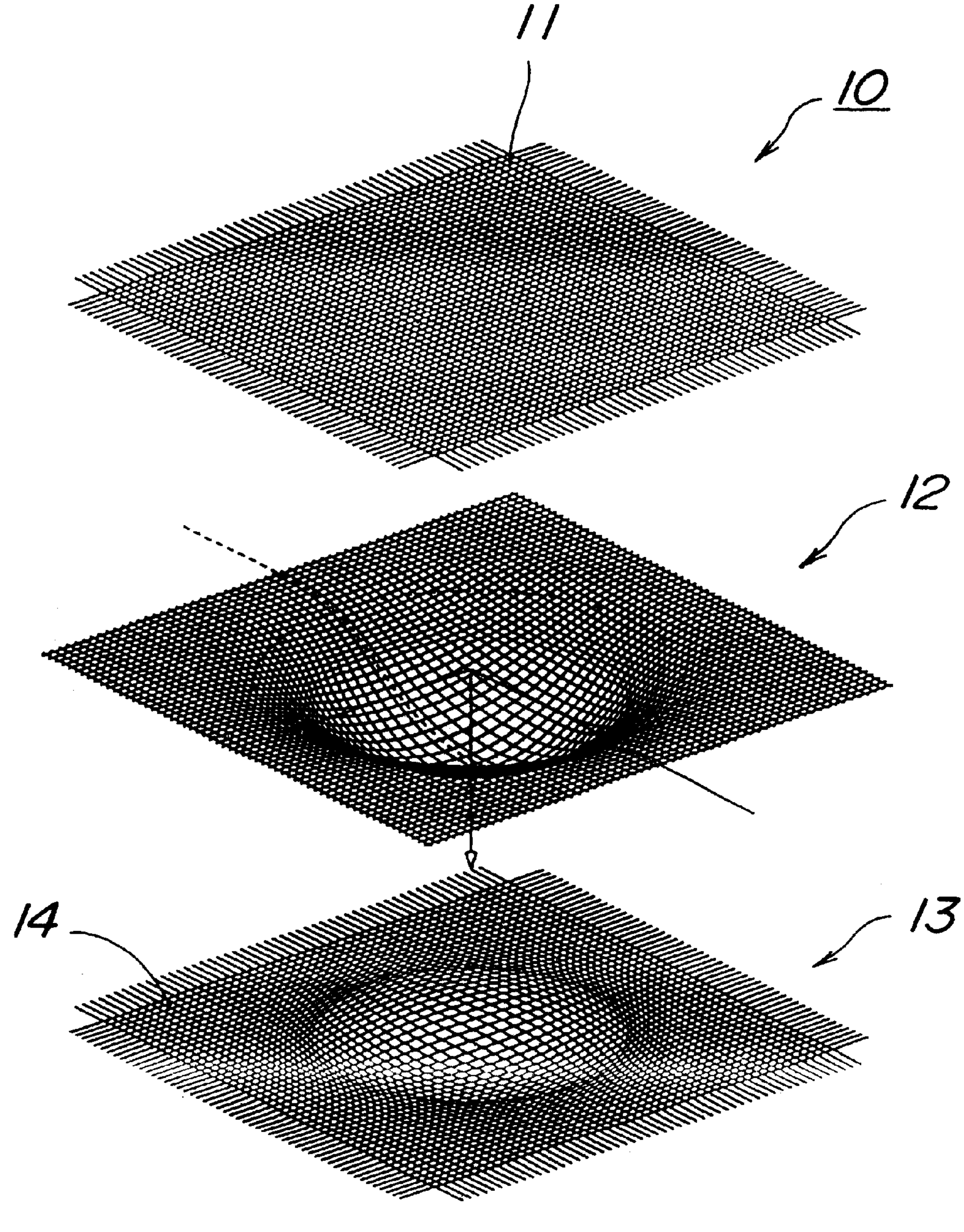
Fig. 1 PRIOR ART
FIG. 1 is an explanatory diagram of the conventional art.
Figure 2:
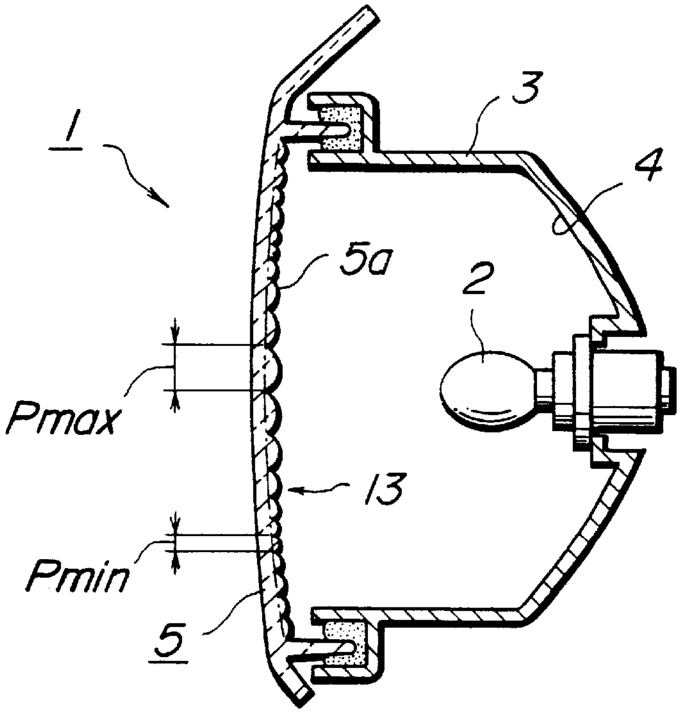
FIG. 2 is a cross section showing a first example of the lamp for a vehicle according to the present invention.

In FIG. 2, reference numeral 1 denotes a cross section of the lamp 1 for vehicle in accordance with the present invention. This lamp 1 for vehicle includes a light source 2, a housing 3, a reflector 4 and a lens 5. The pitch of the lens cut 5*a* processed to the lens 5 is set by the above-mentioned method as a pattern shown in FIG. 3, so as to give an observer an optical illusion that generates a three-dimensional appearance.

Figure 3:
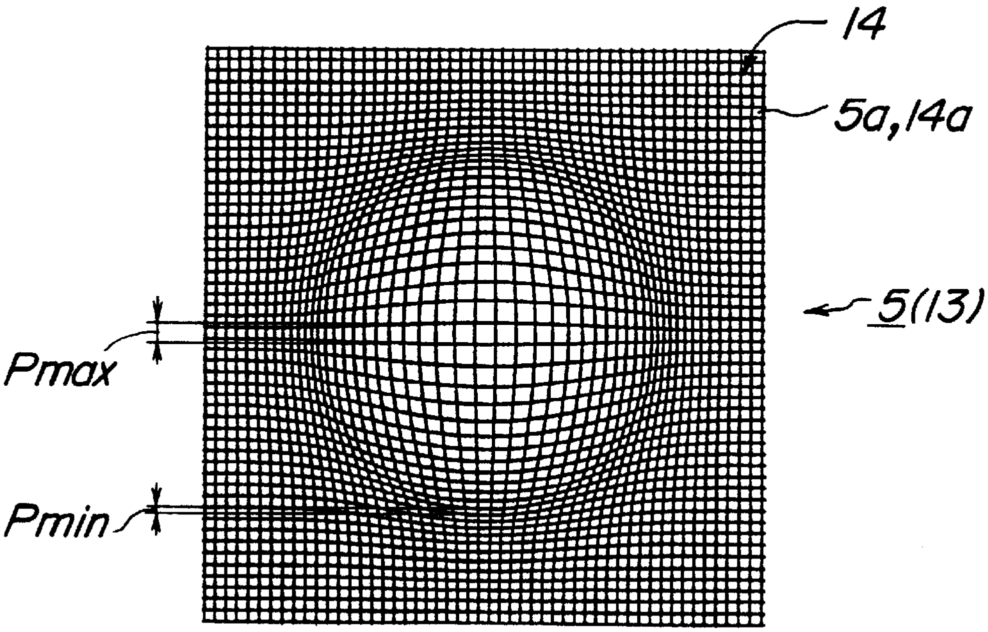
FIG. 3 is a front view of a principal portion of the first example.

In the first embodiment of the present invention, the ratio of the minimum pitch Pmin and the maximum pitch Pmax that appear in the deformed cross hatching pattern 14 as shown in FIG. 3 is restricted. In the present invention, the allowable range for the maximum pitch Pmax is set 1.5 times or more and 20 times or less for the minimum pitch Pmin.

In order to realize the above-mentioned restriction, the above-mentioned shape of the deformation given to the imaginary plane should be restricted. Namely, if the shape of the deformation given to the imaginary plane is so small, it is difficult to obtain the condition where the maximum pitch Pmax is 1.5 times or more the minimum pitch Pmin. On the contrary, if the shape of the deformation given to the imaginaryplane is so large, it is difficult to obtain the condition where the maximum pitch Pmax is 20 times or less the minimum pitch Pmin.

Next, the effect of the lamp 1 for vehicle of the first embodiment having the above-mentioned configuration is explained. According to the result of the computer simulation that was performed by the inventors for completing the present invention, impression of the observer when the above-mentioned ratio is less than 1.5 times is something less than a deterioration of the deformed cross hatching pattern 14. Therefore, it is recognized not to be able to give the lens surface a three-dimensional appearance, and the purpose cannot be achieved.

The section 14*a* is shaped as a lens cut 5*a* such as a convex lens so that the lamp can diffuse parallel light from the reflector 4 to realize a light distribution characteristics as the lamp 1 for vehicle. In this case, if the above-mentioned ratio exceeds 20 times, the aspect ratio of the section 14*a* becomes large, and the curvature given to the section becomes large, so that the diffusion can be insufficient.

This means that the characteristics of the lamp 1 for vehicle become insufficient. According to the result of the computer simulation and the investigation, it is recognized that the above-mentioned ratio is required to be 20 times or less in order to satisfy the necessary performance for the lamp for vehicle 1. As a result, it is discovered that the proper range of the above-mentioned ratio is 1.5 times or more and 20 times or less.

Figure 4:
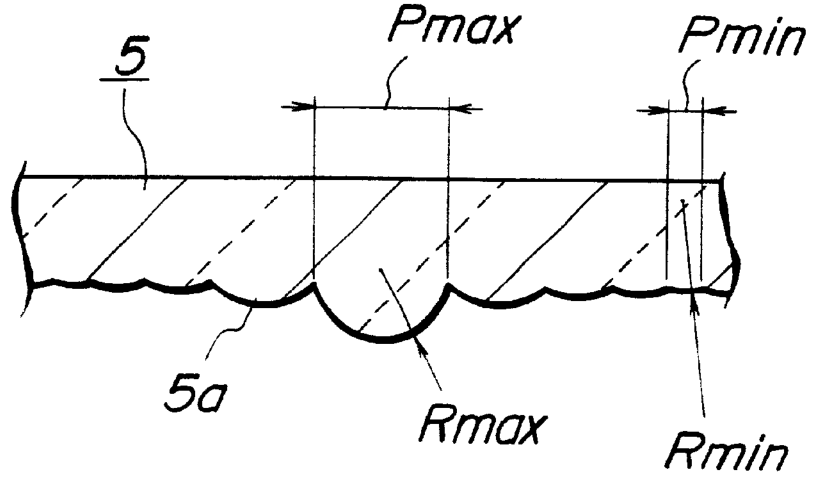
FIG. 4 is a cross section showing a second example of the lamp for a vehicle according to the present invention.

FIG. 4 shows a principal portion of a second embodiment of the present invention, which is concerned to an appearance of the lamp 1 for vehicle at the lightened state. The cross section shown in FIG. 4 is substantially identical to the state where the lens cut surface of the pattern shown in FIG. 3 is cut along the line passing through the center.

Since the section 14*a* of the surface of the lens 5 is formed by the deformed cross hatching pattern 14, the lens cut 5*a* that is formed in accordance with the section 14*a* has different areas. Therefore, if a lightened state of the conventional lamp 1 for vehicle, i.e., a uniform brightness in the whole surface of the lens 5 is desired, a diffusion coefficient corresponding to the area of the section 14*a* should be given, so that the brightness becomes uniform in the whole surface of the lens 5. For this purpose, a portion with a small pitch between the deformed cross hatching pattern 14, e.g., the portion with the minimum pitch Pmin is set by the curvature Rmin of the small diffusion coefficient, while a portion with a large pitch, e.g., the portion with the maximum pitch Pmax is set by the curvature Rmax of the large diffusion coefficient.

Figure 5:
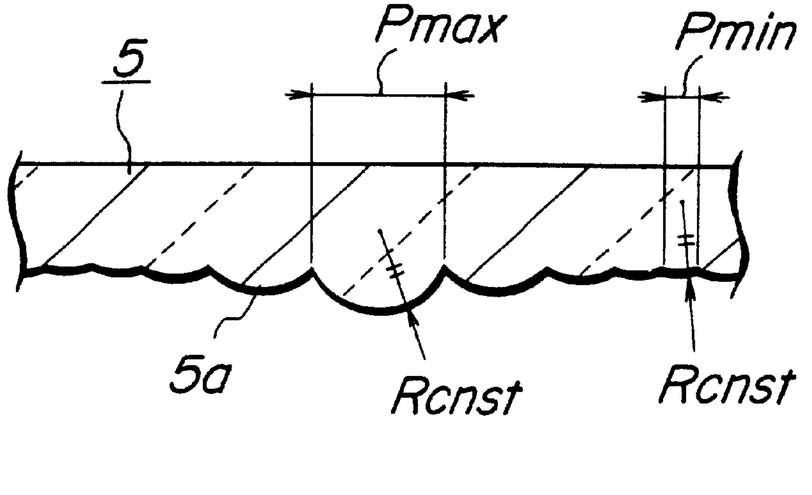
FIG. 5 is a cross section showing a third example of the lamp for a vehicle according to the present invention.

In addition, according to the present invention, the surface of the lens 5 can be provided with a novel design by the deformed cross hatching pattern 14. In this case, the lens surface of the a third embodiment shown in FIG. 5 is mentioned. In this third embodiment, regardless of the area of each section 14*a*, the lens cut 5*a* is formed by the curvature Rcnst so that all of the sections 14*a* have the same diffusion coefficient. According to this configuration, the quantity of light emitted from the lens cut 5*a* is substantially proportional to the area. A portion of small area is observed as dark, while a portion of large area is bright. When an observer observes the lens surface of this condition, an optical illusion may occur so that the portion of large area look near, while the portion of small area looks distant. When the above-mentioned difference of the emitted light quantity is added to this state, an optical illusion that the near portion looks bright and the distant portion is dark is generated. Thus, the surface of the lens 5 is recognized with more three-dimensional appearance.

Each of the second and third embodiments can be selected in accordance with the application. For example, it can be selected in accordance with the specification of the destination or car user's taste in the destination. In addition, the curvature given to the lens cut 5*a* can be set in the state between the second embodiment and the third embodiment, so as to control the portion of the optical illusion due to the brightness properly.

Figure 6:
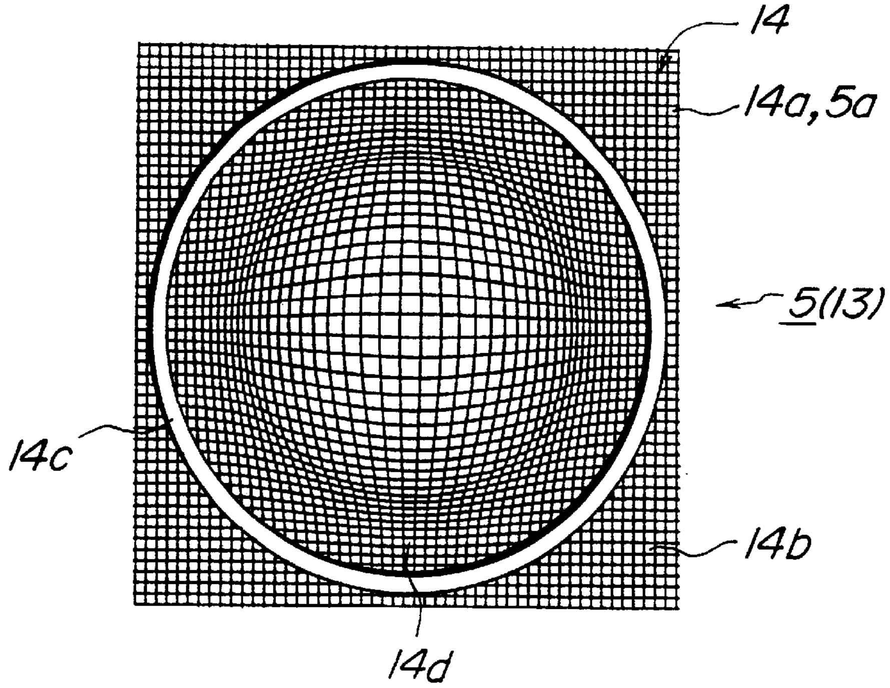
FIG. 6 is a cross section showing a fourth example of the lamp for a vehicle according to the present invention.
Figure 7:
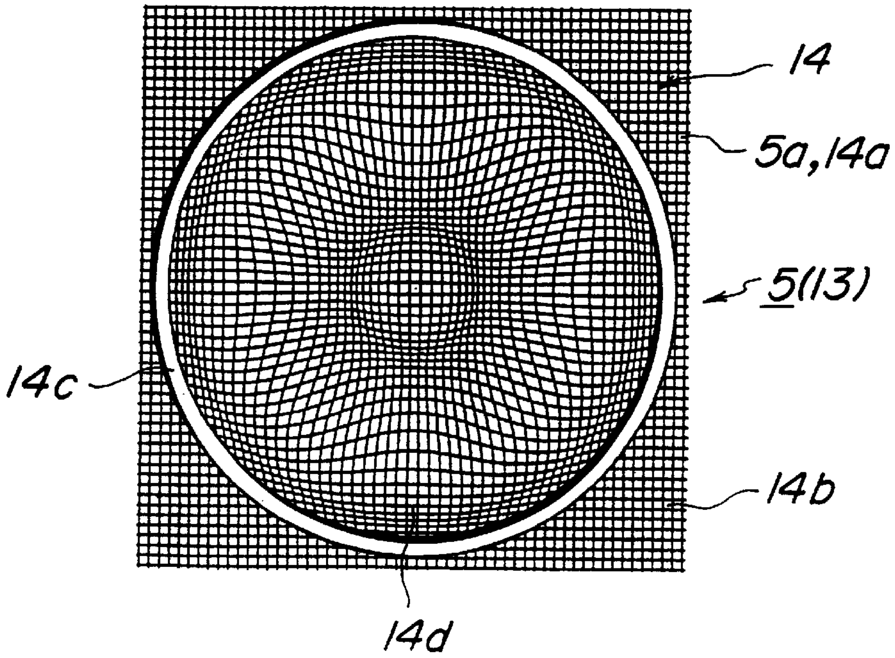
FIG. 7 is a cross section showing amodified state of the fourth example of the lamp for a vehicle according to the present invention.

FIGS. 6 and 7 show a fourth embodiment of the present invention. In this embodiment, responsiveness of the lamp for a vehicle 1 of the present invention can be improved for a minor change of the vehicle.

In the present invention, the surface of the lens 5 should be processed by the lens cut 5*a* in accordance with the deformed cross hatching pattern 14. This is a very special process. Therefore, even if a design change is a partial change, at least a part of the mold for forming the lens cut 5*a* is required to all be remade.

Therefore, in the fourth embodiment, the section 14*a* of the same deformed cross hatching pattern 14 is divided into a nondeformed portion 14*b* whose cross hatching pattern 11 is not deformed and a deformed portion 14*d* whose cross hatching pattern 11 is deformed. At the position of substantial boundary between the non-deformed portion 14*b* and the deformed portion 14*d*, as shown in FIG. 6, a concave or convex rib 14*c* is further formed as a discontinuous portion. Thus, if a design is changed, only the deformed portion 14*d* should be changed in shape. In addition, even if a minor shift is generated between the deformed cross hatching pattern 14 of the deformed portion 14*d* and the deformed cross hatching pattern 14 of the non-deformed portion 14*b* due to a design change, an observer may not feel this is abnormal so much since the discontinuous portion 14*c* exists.

The mold for making the above-mentioned lens 5 can be made as a nest of the mold for the non-deformed portion 14*b* and the mold for the deformed portion 14*d*. By changing the mold for the deformed portion 14*d* into another shaped one, a lamp 1 for vehicle having a different design can be manufactured quickly and inexpensively, as shown in FIG. 7. Thus, it is easy to respond a request for a minor change from the car design side.

While the presently preferred embodiment of the present invention has been shown and described, it will be understood that the present invention is not limited thereto, and that various changes and modifications may be made by those skilled in the art without departing from the scope of the invention as set forth in the appended claims.

What is claimed is:

1. A lamp for a vehicle comprising a light source, a housing, a reflector and a lens, wherein the lens is made by the process comprising the steps of:

(a) assuming an imaginary plane with a cross-hatching pattern made of crossing groups of plural lines disposed in parallel at a constant pitch;

(b) deforming the imaginary plane by a desired shape including a convex surface, a concave surface or a combination of both surfaces, so that the cross hatching pattern is deformed into a process surface;

(c) orthographically projecting the process surface onto the lens surface; and (d) processing a lens cut in accordance with the cross hatching pattern when the process surface is orthographically projected onto the lens surface, wherein the deformation given to the imaginary plane is performed so that the maximum pitch of the cross hatching pattern orthographically projected onto the lens surface is 1.5 times or more and 20 times or less the minimum pitch.

2. A lamp for the vehicle comprising a light source, a housing, a reflector and a lens, wherein the lens is made by the process comprising the steps of:

(a) assuming an imaginary plane with a cross hatching pattern made of crossing groups of plural lines disposed in parallel at a constant pitch;

(b) deforming the imaginary plane by a desired shape including a convex surface, a concave surface or a combination of both surfaces, so that the cross hatching pattern is deformed into a process surface;

(c) orthographically projecting the process surface onto the lens surface; and (d) processing a lens cut in accordance with the cross hatching pattern when the process surface is orthographically projected onto the lens surface, and processing the lens cut with curvatures of the same diffusion coefficient regardless of the pitch of the cross hatching pattern.

3. A lamp for the vehicle comprising a light source, a housing, a reflector and a lens, wherein the lens is made by the process comprising the steps of:

(a) assuming an imaginary plane with a cross hatching pattern made of crossing groups of plural lines disposed in parallel at a constant pitch;

(b) deforming the imaginary plane by a desired shape including a convex surface, a concave surface or a combination of both surfaces, so that the cross hatching pattern is deformed into a process surface;

(c) orthographically projecting the process surface onto the lens surface; and (d) processing a lens cut in accordance with the cross hatching pattern when the process surface is orthographically projected onto a lens surface, and processing the lens cut with curvatures whose diffusion coefficient becomes greater when the pitch of the cross hatching pattern becomes greater.

4. A lamp for the vehicle comprising a light source, a housing, a reflector and a lens, wherein the lens is made by the process comprising the steps of:

(a) assuming an imaginary plane with a cross hatching pattern made of crossing groups of plural lines disposed in parallel at a constant pitch;

(b) deforming the imaginary plane by a desired shape including a convex surface, a concave surface or combination of both surfaces, so that the cross hatching pattern is deformed into a process surface;

(c) orthographically projecting the process surface onto the lens surface; and (d) processing a lens cut in accordance with the cross hatching pattern when the process surface is orthographically projected onto the lens surface, and (e) forming a convex or concave rib as a discontinuous portion in at least a part of the substantial boundary between the process surface in which the cross hatching pattern of the lens surface is deformed and the process surface in which the cross hatching pattern is not deformed.

5. A method for providing a lens for a lamp for a vehicle, wherein the lamp comprises a light source, a reflector and a lens, the process of making the lens comprising the steps of:

(a) assuming an imaginary plane with a cross-hatching pattern made of crossing groups of plural lines disposed in parallel at a constant pitch;

(b) deforming the imaginary plane by a desired shape including a convex surface, a concave surface or a combination of both surfaces, so that the cross hatching pattern is deformed into a process surface;

(c) orthographically projecting the process surface onto the lens surface; and (d) processing a lens cut in accordance with the cross hatching pattern when the process surface is orthographically projected onto the lens surface, wherein the deformation given to the imaginary plane is performed so that the maximum pitch of the cross hatching pattern orthographically projected onto the lens surface is 1.5 times or more and 20 times or less the minimum pitch.

6. A method for providing a lens for a lamp for a vehicle, wherein the lamp comprises a light source, a reflector and a lens, the process of making the lens comprising the steps of:

(a) assuming an imaginary plane with a cross hatching pattern made of crossing groups of plural lines disposed in parallel at a constant pitch;

(b) deforming the imaginary plane by a desired shape including a convex surface, a concave surface or a combination of both surfaces, so that the cross hatching pattern is deformed into a process surface;

(c) orthographically projecting the process surface onto the lens surface; and (d) processing a lens cut in accordance with the cross hatching pattern when the process surface is orthographically projected onto the lens surface, and processing the lens cut with curvatures of the same diffusion coefficient regardless of the pitch of the cross hatching pattern.

7. A method for providing a lens for a lamp for a vehicle, wherein the lamp comprises a light source, a reflector and a lens, the process of making the lens comprising the steps of:

(a) assuming an imaginary plane with a cross hatching pattern made of crossing groups of plural lines disposed in parallel at a constant pitch;

(b) deforming the imaginary plane by a desired shape including a convex surface, a concave surface or a combination of both surfaces, so that the cross hatching pattern is deformed into a process surface;

(c) orthographically projecting the process surface onto the lens surface; and (d) processing a lens cut in accordance with the cross hatching pattern when the process surface is orthographically projected onto a lens surface, and processing the lens cut with curvatures whose diffusion coefficient becomes greater when the pitch of the cross hatching pattern becomes greater.

8. A method for providing a lens for a lamp for a vehicle, wherein the lamp comprises a light source, a reflector and a lens, the process of making the lens comprising the steps of:

(a) assuming an imaginary plane with a cross hatching pattern made of crossing groups of plural lines disposed in parallel at a constant pitch;

(b) deforming the imaginary plane by a desired shape including a convex surface, a concave surface or combination of both surfaces, so that the cross hatching pattern is deformed into a process surface;

(c) orthographically projecting the process surface onto the lens surface; and (d) processing a lens cut in accordance with the cross hatching pattern when the process surface is orthographically projected onto the lens surface, and (e) forming a convex or concave rib as a discontinuous portion in at least a part of the substantial boundary between the process surface in which the cross hatching pattern of the lens surface is deformed and the process surface in which the cross hatching pattern is not deformed.

* * * * *